United States Patent
Cheng et al.

(10) Patent No.: US 6,631,206 B1
(45) Date of Patent: Oct. 7, 2003

(54) IMAGE FILTERING IN HSI COLOR SPACE

(75) Inventors: Taiyi Cheng, Fremont, CA (US); Hyun Wook Park, Taejon (KR); Yongmin Kim, Seattle, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 09/533,394

(22) Filed: Mar. 22, 2000

Related U.S. Application Data (63) Continuation-in-part of application No. 09/386,538, filed on Aug. 30, 1999.

(51) Int. Cl.$^7$ .................................................. G06K 9/00
(52) U.S. Cl. ..................... 382/164; 382/162; 382/165; 382/166; 382/167; 382/173; 382/260; 382/274; 382/282; 358/515; 358/520; 358/532; 358/538
(58) Field of Search ................................ 382/103, 162, 382/164–167, 173, 181, 191, 205, 210, 232, 239, 242, 243, 248, 254, 260, 262–266, 274–276, 282, 224, 225, 288; 348/30, 169, 606, 625, 630; 358/447, 515, 520, 521, 532, 538; 375/240.02, 240.08; 708/300, 304, 320, 322

(56) References Cited

U.S. PATENT DOCUMENTS

| | | | | |
|---|---|---|---|---|
| 4,819,077 A | * | 4/1989 | Kikuchi et al. | 348/71 |
| 5,949,914 A | * | 9/1999 | Yuen | 382/254 |
| 5,959,693 A | * | 9/1999 | Wu et al. | 348/624 |
| 5,995,164 A | * | 11/1999 | Tsyrganovich | 348/649 |
| 6,226,401 B1 | * | 5/2001 | Yamafuji et al. | 382/165 |
| 6,229,580 B1 | * | 5/2001 | Inoue | 348/649 |

OTHER PUBLICATIONS

Mital, et al discloses "colour vision for industrial applications", IEEE, pp. 519–522, 1989.*
Ladley, et al discloses "fundamentals of true-color image processing", IEEE, pp. 791–795, 1990.*
Lin, et al discloses "color image segmentation using modified HSI system for road following", IEEE, pp. 1998–2003, 1991.*
Welch, et al discloses "image processing using the HSI color space", IEEE, pp. 722–725, 1991.*
Parsiani discloses "isolated noise detection and reduction in color images", IEEE, pp. 741–743, 1993.*
Sobottka, et al discloses "segmentation and tracking of faces in color images", IEEE, pp. 236–241, 1996.*
Sparling, et al discloses "photoelastic analysis using chromatic interpretation of digitized video", IEEE, pp. 417–418, 1997.*
Terillon, et al discloses "automatic detection of human faces in natural scene images by use of a skin color model and of invariant moments", IEEE, pp. 112–117, 1998.*

(List continued on next page.)

*Primary Examiner*—Daniel G. Mariam
(74) *Attorney, Agent, or Firm*—Steven P. Koda

(57) ABSTRACT

A method for filtering an angular signal which avoids errors in averaging and differencing operations. Components of a hue signal are separated into groups based upon the sign of a corresponding filter coefficient $a_i$ for the respective component and the range of the hue component value $v_i$. A weighted mean is computed for each of the groups. The weighted mean of the resulting values having positive filter coefficients and the weighted mean of the resulting values having negative filter coefficients then are derived. The computed value is redefined if needed to be in modulus $2\pi$. The weighted distance of the two values then is derived. The result is the filtered hue value for a given image data pixel. A filtered hue value is obtained in the same manner for each image pixel of a desired image object or of a given image frame.

17 Claims, 7 Drawing Sheets

OTHER PUBLICATIONS

Herodotou, et al discloses "a color segmentation scheme for object–based video coding", IEEE, pp. 25–29,1998.*

Carron et al.; "Color Edge Detector Using Jointly Hue, Saturation and Intensity," IEEE Publ. 0–8186–6950–0/94; 1994.

Gonzalez et al.; "Digital Image Processing," Addison–Wesley Pub Co.; pp. 228–237; 1992.

Nikolaidis et al.; "Nonlinear Processing and Analysis of Angular Signals," IEEE Transactions on Signal Processing, vol. 46, No. 12, Dec. 1998.

Perez et al.; "Toward Color Image Segmentation in Analog VLSI: Algorithm and Hardware," International Journal of Computer Vision, vol. 12:1, 1994.

Nevatia, Ramakant; "A Color Edge Detector and Its Use in Scene Segmentation;" IEEE Transactions on Systems, Man and Cybernetics, vol. SMC–7, No. 11, Nov. 1977.

Papoulis, Athanasios; "Probality, Random Variables, and Stochastic Processes" Third Edition, McGraw–Hill, Inc.; 1991.

* cited by examiner

IMAGE FILTERING IN HSI COLOR SPACE

CROSS REFERENCE TO RELATED APPLICATION

This is a continuation in part of U.S. patent application Ser. No. 09/386,538 filed Aug. 30, 1999 of Park et al. for "Image Processing In HSI Color Space Using Adaptive Noise Filtering," the content of which is incorporated herein by reference and made a part hereof.

BACKGROUND OF THE INVENTION

This invention relates to color image processing techniques, and more particularly to a process for filtering the hue component of HSI image data.

Color image processing techniques often are used in image enhancement, video encoding, video editing and computer vision applications. Exemplary techniques include image tracking which relates to the identification of an image object within each a sequence of image frames. Another technique, image segmentation relates to the identification of boundaries and edges of image objects in an image frame.

"HSI" refers to the Hue, Saturation, Intensity color model for presenting color data. There are many different color models (also referred to as color domains or color spaces) developed for the representation and manipulation of color data. Color monitors typically use a Red, Green, Blue (RGB) color model. Color printers typically use a Cyan, Yellow, Magenta (CYM) or a Cyan, Yellow, Magenta, Black (CYMK) color model. Color television broadcast signals typically use a luminance, intensity, color difference (YIQ) color model, where I and Q relate to chrominance.

The Hue Saturation Intensity (HSI) color model closely resembles the color sensing properties of human vision. The intensity component is related to the luminance component decoupled from the color. The hue and saturation components are related to the way in which a human perceives color. Such relation to human vision makes it desirable to use the HSI color model for color image processing techniques, such as image enhancement and image segmentation.

The input image data for color image processing techniques typically is in RGB format. Unfortunately the transformation from RGB to HSI color space and from HSI to RGB color space is very nonlinear and complicated in comparison to the conversion formulas among the other color models. As an example, when an RGB image is degraded by random noise, the nonlinearity in the conversion formulae causes the noise distribution in HSI color space to be nonuniform. Further, the noise distribution in HSI color space depends on the intensity and saturation values of the input data. For example, when the intensity value is small, the noise in the saturation and hue is large. This creates problems in using the HSI color model for image processing techniques, such as image enhancement and image segmentation. Accordingly, there is a need for a method which reduces the magnitude of the noise or the nonuniformity of the noise variance in HSI color space.

SUMMARY OF THE INVENTION

According to the invention, a method for filtering an angular signal avoids errors in averaging and differencing operations.

According to an aspect of this invention, components of an angular signal (e.g. hue) are separated into groups based upon the sign of a corresponding filter coefficient a, for the respective component and the range of the angular (e.g., hue) component value $v_i$. In one group, the filter component $a_i$ is positive and the angular (e.g. hue) component value $v_i$ is within the range $(0, \pi)$. In another group, the filter component $a_i$ is positive and the angular (e.g. hue) component value $v_i$ is within the range $(\pi, 2\pi)$. In yet another group, the filter component $a_i$ is negative and the angular (e.g. hue) component value $v_i$ is within the range $(0, \pi)$. In still another group, the filter component $a_i$ is negative and the angular (e.g. hue) component value $v_i$ is within the range $(\pi, 2\pi)$. Note that the signal in each group falls into either $(0, \pi)$ or $(\pi, 2\pi)$. Also, the filter coefficients in each group are either all positive or all negative.

According to another aspect of the invention, a weighted mean is computed for each of the groups, resulting in corresponding computed mean values. The range of angular signals is restricted to be either $(0, \pi)$ or $(\pi, 2\pi)$ so that the rounding effects are avoided. Also, the filter coefficients are restricted to being nonnegative to avoid substraction among multiple angular signals.

According to another aspect of the invention, the weighted mean of the resulting values having positive filter coefficients and the weighted mean of the resulting values having negative filter coefficients are derived. The computed value is redefined if needed to be in modulus $2\pi$ (e.g., $F_P = F_P$ MOD $2\pi$).

According to another aspect of the invention, a weighted distance of the two values (weighted mean for values having positive coefficients and the weighted mean for values having negative coefficients) is derived. The result is the filtered hue value for a given image data pixel. A filtered hue value is obtained in the same manner for each image pixel of a desired image object or of a given image frame.

HSI filtering is applied to an image frame of HSI data to reduce and more uniformly distribute noise while preserving image feature edges. In one implementation for a sequence of image frames, such filtering allows for improved image object tracking ability and improved image object segmentation.

According to another aspect of the invention, a method is provided for segmenting an image frame of pixel data, in which the image frame includes a plurality of pixels. For each pixel of the image frame, the corresponding pixel data is converted into hue, saturation, intensity color space. The HSI pixel data then is filtered. Object segmentation then is performed to define a set of filtered HSI pixel data corresponding to the image object. The image frame then is encoded in which pixel data corresponding to the image object is encoded at a higher bit rate than other pixel data.

An advantage of the invention is that image segmentation techniques are performed in HSI color space where color sensing properties more closely resemble human vision. According to another advantage of this invention, object boundaries are preserved while noise level is significantly reduced and the noise variance is made more uniform.

These and other aspects and advantages of the invention will be better understood by reference to the following detailed description taken in conjunction with the accompanying drawings.

DESCRIPTION OF SPECIFIC EMBODIMENTS

Overview

Figure 1:
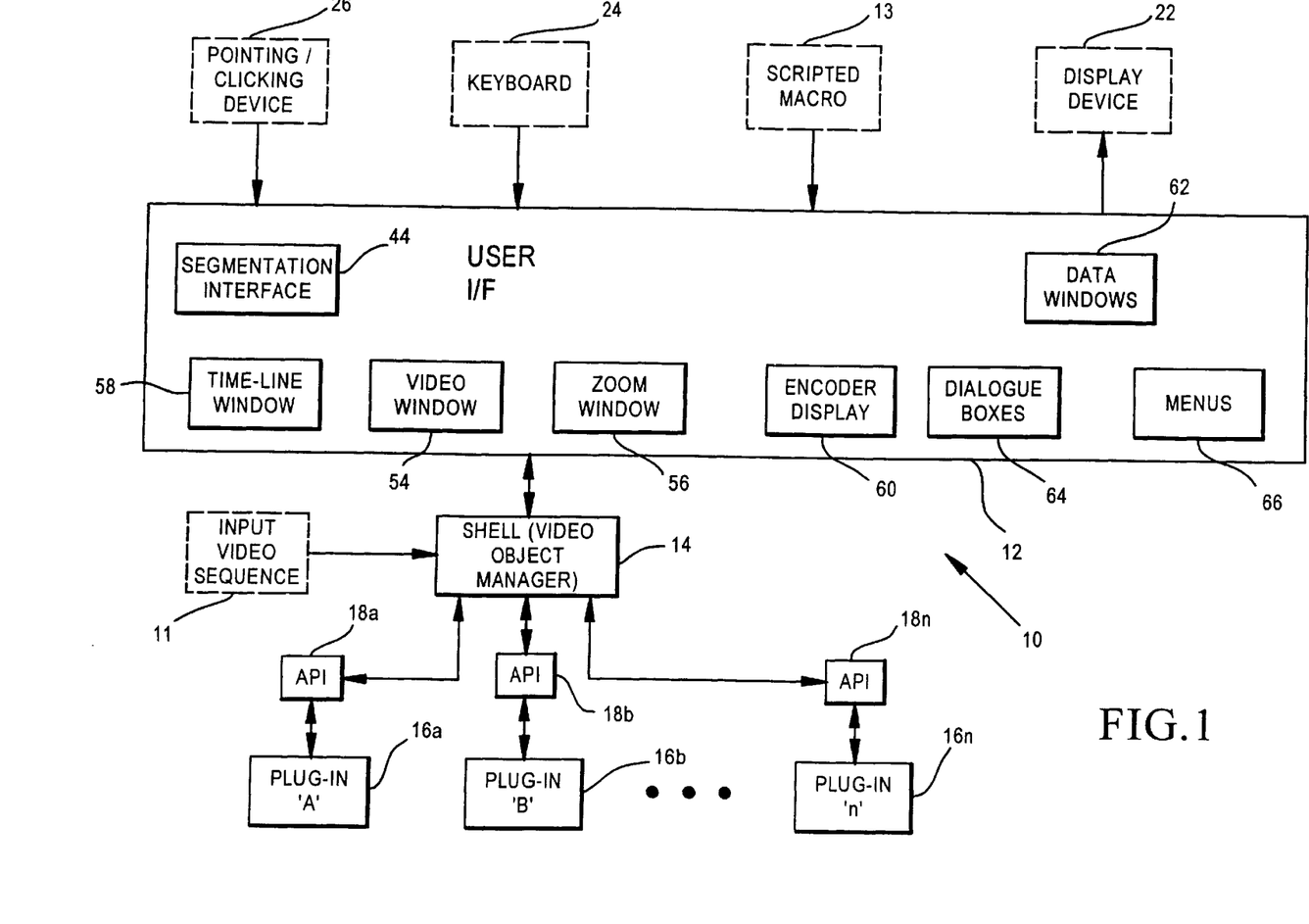
FIG. 1 is a block diagram of an interactive processing environment for tracking video objects among a sequence of video frames.

FIG. 1 shows a block diagram of an interactive processing environment 10 for locating, tracking and encoding video objects. The processing environment 10 includes a user interface 12, a shell environment 14 and a plurality of functional software 'plug-in' programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
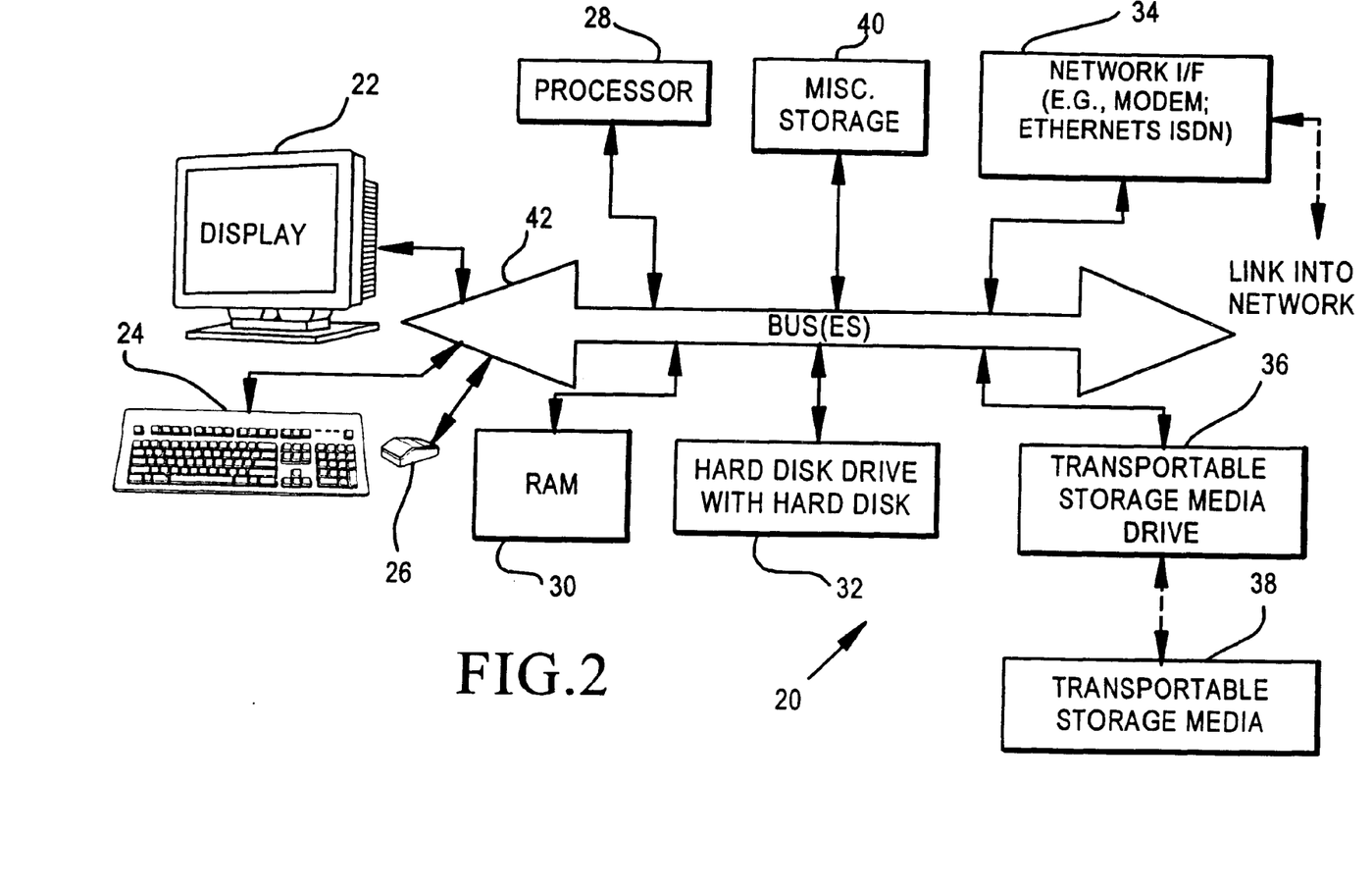
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking, morphological processing and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In one embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program or morphological processing program. The tracking program identifies the video object in subsequent video frames. The morphological processing program postprocesses the identified object for a frame to refine the object shape. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation plug-in, tracking plug-in and morphological plug-in do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a preferred embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

HSI Color Space and HSI Filtering

The Hue Saturation Intensity (HSI) color model closely resembles the color sensing properties of human vision. The intensity component is related to the luminance component decoupled from the color. The hue and saturation components are related to the way in which a human perceives color. Such relation to human vision makes it desirable to use the HSI color model for color image processing techniques, such as image enhancement and image segmentation.

Figure 3:
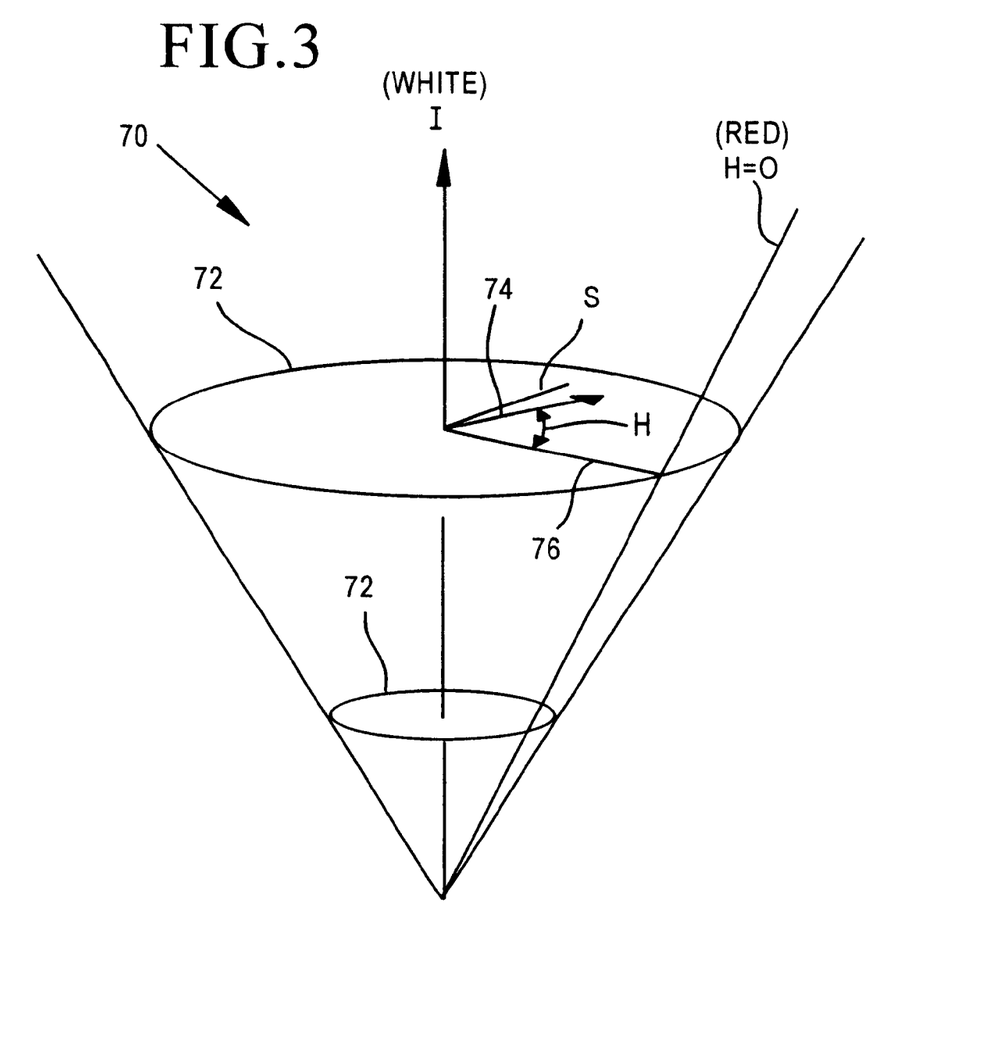
FIG. 3 is a diagram of HSI color space.

Referring to FIG. 3, in an HSI color model 70 the hue component is an angular component, saturation is a radial component and intensity is a planar defining component. Intensity is shown along an I axis. At any given intensity along the I axis, there is a circle 72 with the I axis normal to the circle. A vector 74 representing a color extends from the center point of the given circle to a point within the circle. The angle the vector makes relative to a reference 76 is the hue component H. More specifically, hue is the counterclockwise angle with respect to a reference pure red color having an angle of 0 degrees. Saturation is the radial distance of a color divided by the radius of the circle at a given intensity I. Saturation indicates the color purity or how the color is undiluted by white.

At one step during the image processing input image frame data is converted from RGB or another input format into HSI format. In one embodiment the following equations are implemented to convert from RGB format to HSI format:

$$H = \cos^{-1}\frac{\frac{1}{2}[(R-G)+(R-B)]}{[(R-G)^2+(R-B)(G-B)]^{0.5}} \quad \text{(I)}$$

$$S = 1 - \frac{3}{R+G+B}[\min(R,G,B)] \quad \text{(II)}$$

$$I = \frac{1}{3}(R+G+B) \quad \text{(III)}$$

where R, G and B are the respective ROB components of the input data;

min (R,G,B) denotes a function for the minimum of R, G and B;

the ranges S, I, R, G and B are in [0,1], while H is in degrees (0 to 360°);

Hue=H, where B<G,

Hue=360−H where B>G

Nonlinearity of Noise in HSI Conversion:

For an input image with data in ROB format, noise occurs in the ROB color space. It is assumed that random gaussian noise with zero mean and $\sigma^2$ variance occurs in the RGB image data. In addition, the noise in each RGB color component is assumed to be independent from one another and also from the image data signal. As shown in Eqs. (I)–(III), the RGB-to-HSI conversion equations are nonlinear. For example, the noise variance of intensity (I) is $\sigma^2/3$. However, the noise variances in hue and saturation cannot be defined analytically since they have a kind of Cauchy distribution, where mean and variance do not exist. Therefore, the noise characteristics of hue and saturation have been evaluated experimentally.

In order to measure the noise variance of hue and saturation and to analyze the noise dependency on the image data, several sample images are created in the HSI color space. In one embodiment a 256×256-pixel sample image is divided into 16×16 blocks with each block having 16×16 pixels. Each block in one sample image has constant HSI values as defined below:

H(i,j)=64 for $1 \leq i \leq 16$, $1 \leq j \leq 16$

S(i,j)=9+7j for $1 \leq i \leq 16$, $1 \leq j \leq 16$

I(i,j)=9+7i for $1 \leq i \leq 16$, $1 \leq j \leq 16$ where i and j are block numbers in horizontal and vertical directions, respectively. The sample image has an intensity value increasing horizontally while the saturation value increases vertically. The experiment is repeated with several different hue values.

In each experiment the sample image in the HSI color space is converted to the RGB color space, and random Gaussian noise is added to each RGB color component. The noise has a Gaussian distribution with zero mean and $\sigma^2$ variance. The image with noise in the RGB color space is reconverted to the HSI color space and the noise characteristics are analyzed. Noise in the HSI color space is computed as follows:

$$\begin{bmatrix} n_h \\ n_s \\ n_i \end{bmatrix} = RGB \text{ to } HSI \begin{bmatrix} R+n_r \\ G+n_g \\ B+n_b \end{bmatrix} - RGB \text{ to } HSI \begin{bmatrix} R \\ G \\ B \end{bmatrix} \quad \text{(IV)}$$

where, RGB to HSI[ ] corresponds to the conversion Eqs. I–III from RGB to HSI;

($n_r$, $n_g$, $n_b$) are the noises in RGB color components, respectively; and ($n_h$, $n_s$, $n_i$) are the noises in HSI color components, respectively.

In an example where H=64, the noise that is added to the RGB image, ($n_r$, $n_g$, $n_b$), has a variance of 9. It is observed that the noise in the saturation component ($n_s$) depends on the intensity value, (i.e., it is large when the intensity is small). The noise in the hue component ($n_h$) depends on the intensity and saturation values, (i.e., it is large when the intensity and saturation values are small).

Figure 4:
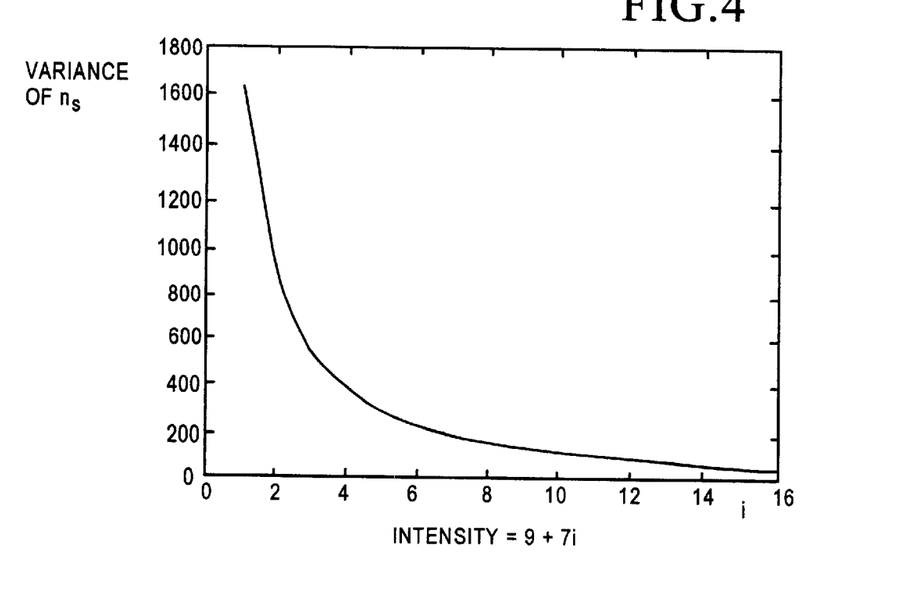
FIG. 4 is a chart of saturation component noise variance versus intensity.
Figure 5:
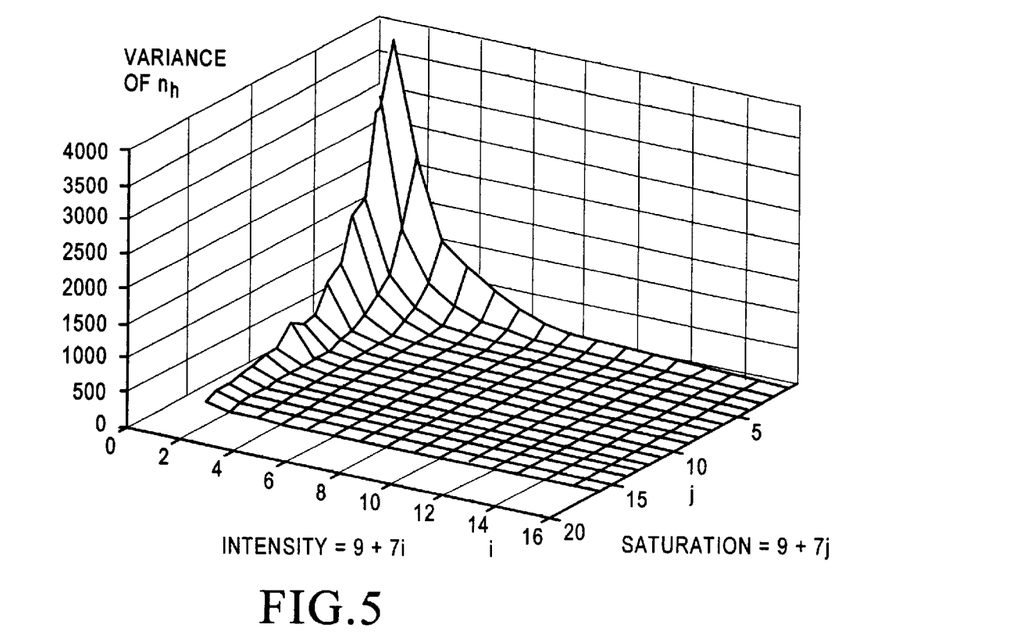
FIG. 5 is a 3D graph of hue component noise variance versus intensity and saturation.

To show the relationship between noise and the image data, the variance of noises in saturation and hue is analyzed with respect to the intensity and saturation values. In FIG. 4, the variance of $n_s$ is plotted with respect to the intensity value, which is approximately proportional to 1/Intensity$^2$. The variance of $n_s$ also depends on the hue and saturation values, but their effects are negligible in comparison with that from the intensity value. FIG. 4 plots the mean value of the variance of $n_s$ with different hue and saturation values. FIG. 5 shows the variance of $n_h$ with respect to the intensity and saturation values. The variance of $n_h$ also depends on the hue value itself, but this dependency is negligible compared with that on the intensity and saturation values. Accordingly, in applicant's model, noise in the saturation component is taken to be proportional to the value of the intensity component. Noise in the hue component is taken to be proportional to the value in the intensity and saturation components.

By defining hue as an angular component, there is a periodicity to hue. Such periodicity quality causes difficulties in averaging and measuring distances of hue components. Because hue is the counterclockwise angle with respect to the red color, both 0 and $2\pi$ (360°) represent the same red color. The hue values with 8-bit resolution are obtained by mapping 0~$2\pi$ to 0~255. Both the values of 0 and 255 correspond to the similar red color. In traditional processing, however, the values of 0 and 255 are supposed to be most different. Thus, performing traditional processing on the hue values introduces some artifacts, called a rounding effect. The rounding effect is different from random noise, since it is correlated with the neighboring signals.

Figures 6, 7:
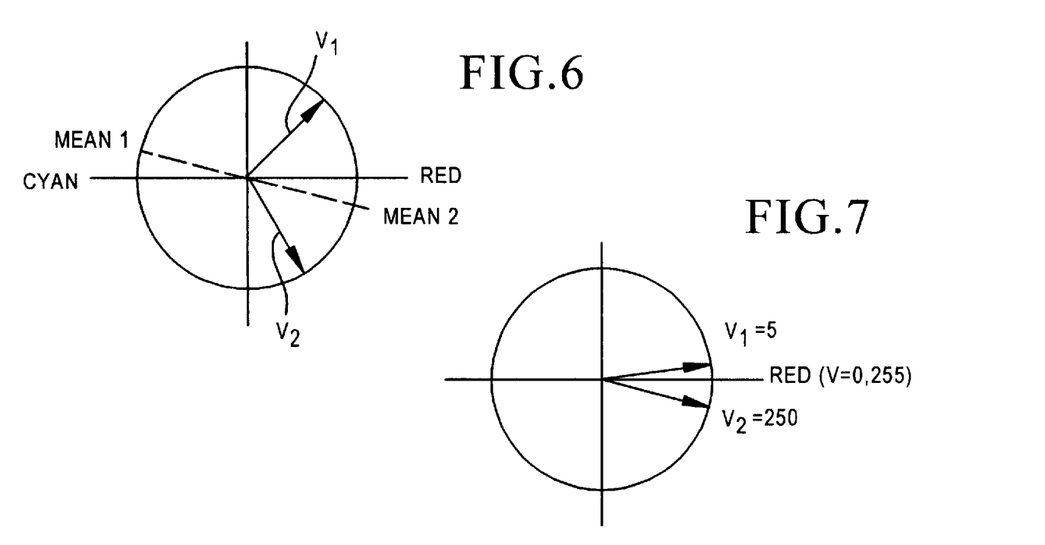
FIG. 6 is a diagram showing alternative averages for two hue values.
FIG. 7 is a diagram showing a distance between two hue values.

With regard to the averaging difficulty, traditional averaging and smoothing operations cannot be applied directly to data when processing angular signals. Consider two hue values $V_1$ and $V_2$ shown in FIG. 6. If, for example, the values of $V_1$ and $V_2$ are 20 and 200 in 8 bits, respectively, the conventional mean of these two values is:

mean1=(20+200)/2=110.

However, both $V_1$ and $V_2$ are closer to red than to cyan as shown in FIG. 6. Therefore, the mean value should be closer to red than to cyan. The better mean of $V_1$ and $V_2$ would be mean2 where:

mean2=mean1+128=238.

The averaging of more than two hue values is even more complicated than the case of averaging two values. In addition, the smoothing of angular signals with various filter coefficients is not straightforward. Because the averaging and smoothing operations are common in image processing, correctly performing the averaging and smoothing of hue values without creating artifacts is important.

With regard to the distance difficulty, the distance between two linear values typically is equal to their arithmetic difference. However, the distance between two angular signal values is not always equal to the linear difference. For example, the correct distance between the hue values of 5 and 250 on an angular scale of 0 to 255 is 10, because both values correspond to a similar red color as graphically shown in FIG. 7.

Figure 8:
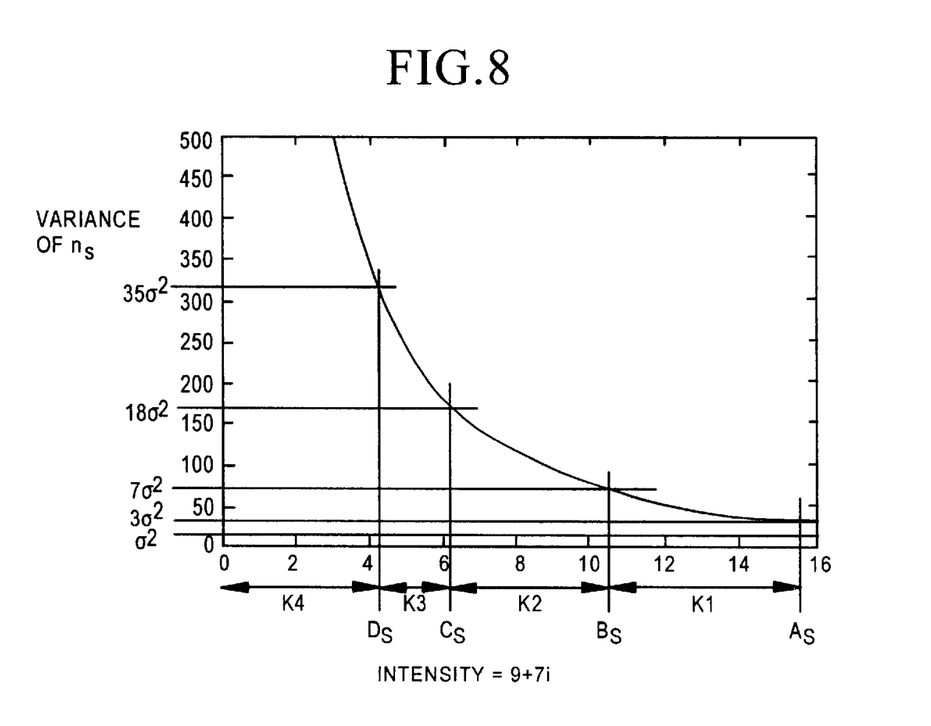
FIG. 8 is a chart showing sample thresholds for selecting a filtering kernel for filtering the saturation component.

Intensity and Saturation Component Filtering:

The variance of the intensity component is linear and thus filtered using conventional techniques. The filtering of the saturation component is achieved as described in U.S. patent application Ser. No. 09/386,538 filed Aug. 30, 1999 of Park et al. for "Image Processing In HSI Color Space Using Adaptive Noise Filtering." As described therein an adaptive spatial filtering process is performed in which kernel size of an averaging filter is adapted to make the noise distribution in the HSI color space more uniform while preserving image edge information. The kernel size is adapted based on noise variance. The kernel is selected from a set of kernels for each pixel according to the intensity and saturation values. In one embodiment saturation component threshold values ($A_s$, $B_s$, $C_s$, $D_s$) for filtering the saturation component are defined based on the noise analysis results in FIGS. 4. For example, the filter kernel K1 is applied when the variance on $n_s$ is between $3\sigma^2$ and $7\sigma^2$. Then the noise variance after filtering with the K1 kernel is between $3\sigma^2/5$ and $7\sigma^2/5$. Similarly, the K2, K3, and K4 kernels are used when the variance ranges of $n_s$ are $[7\sigma^2]$, $18\sigma^2$, $[18\sigma^2, 35\sigma^2]$, and $[35\sigma^2 \infty]$, respectively. The saturation component threshold values of $A_s$, $B_s$, $C_s$, and $D_s$ are selected from the intensity axis (of FIG. 4) to correspond (in the $n_s$ variance axis) to $3\sigma^2$, $7\sigma^2$, $18\sigma^2$, $35\sigma^2$, respectively as shown in FIG. 8. In alternative embodiments the number of filter kernels and/or their shapes and coefficient values may be varied or increased, in which case the new threshold values are determined to make the noise distribution more uniform. When the number of filter kernels increases, the noise distribution is made more uniform, and the noise variance is further reduced for extremely small intensity and/or saturation values.

Once the saturation component threshold values ($A_s$, $B_s$, $C_s$, and $D_s$) are established, the saturation component of the HSI image is filtered adaptively by the filter kernel selected for each pixel based on its intensity value according to equation (V) below:

$$\text{filter kernel for } S(x, y) = \begin{cases} \text{no filter,} & \text{for } A_s < I(x, y) \\ K1, & \text{for } B_s < I(x, y) \le A_s \\ K2, & \text{for } C_s < I(x, y) \le B_s \\ K3, & \text{for } D_s < I(x, y) \le C_s \\ K4, & \text{for } I(x, y) \le D_s \end{cases} \quad (V)$$

where (x,y) are the horizontal and vertical coordinates of a respective image pixel.

Figure 9:
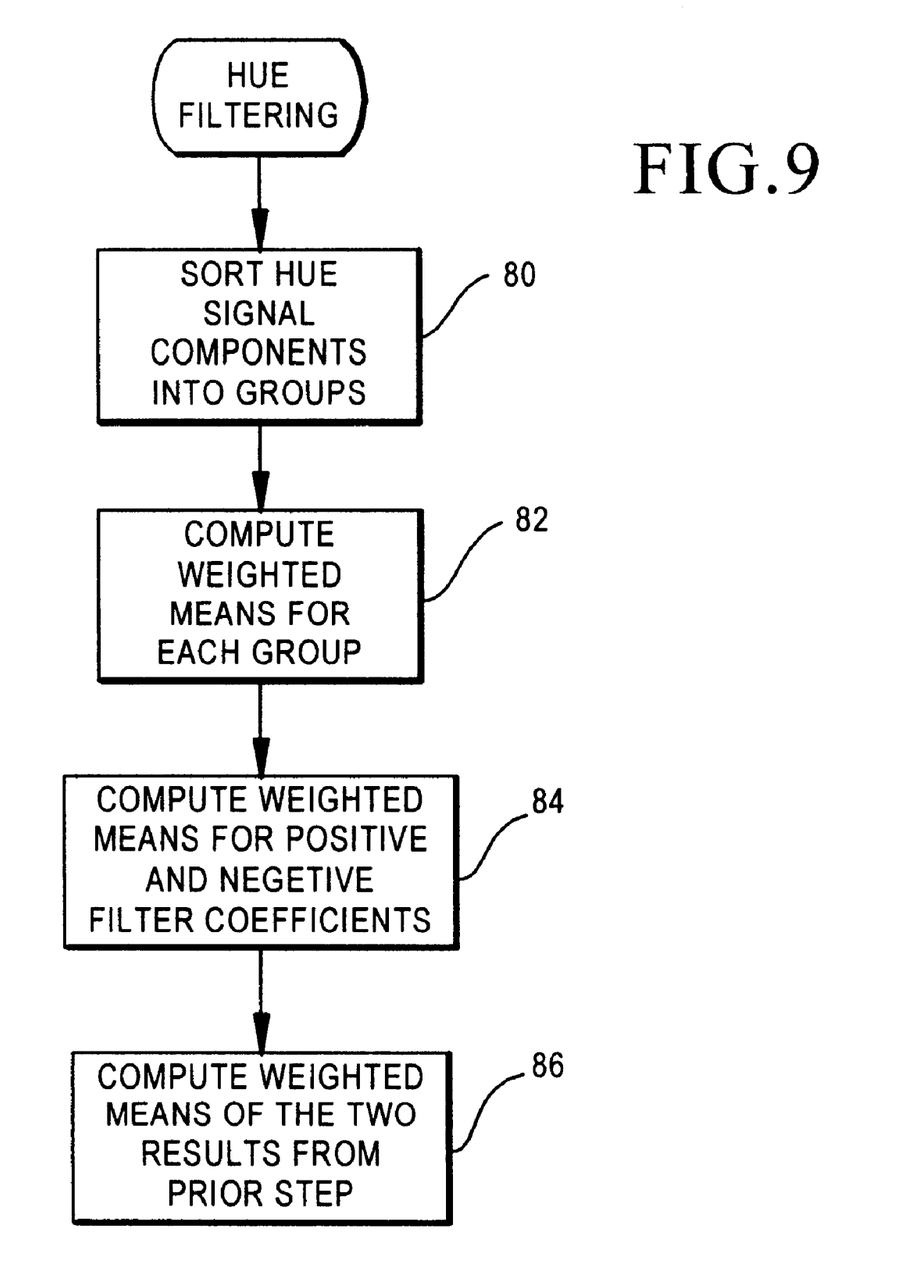
FIG. 9 is a flow chart of the hue component filtering according to an embodiment of this invention.

Hue Component Filtering:

In a preferred embodiment hue component filtering is achieved in four steps. Referring to FIG. 9, at step 80 the components of a hue signal within the range of a filter window are processed. The hue values for pixels within a given window about a pixel for which the hue value is being filtered are input to the filter. Specifically, the hue values for the window are separated into four groups according to the sign of the filter coefficient $a_i$ for the respective component and a range subset of the hue component value $v_i$ as follows:

|         | $0 \le v_i < \pi$ | $\pi \le v_i < 2\pi$ |
|---------|-------------------|----------------------|
| $a_i \ge 0$ | PP                | PN                   |
| $a_i < 0$   | NP                | NN                   | where, P means positive and N means negative. Thus in a first group PP, the filter component $a_i$ is positive and the hue component value $v_i$ is within the range subset $(0, \pi)$. In a second group PN, the filter component $a_i$ is positive and the hue component value $v_i$ is within the range subset $(\pi, 2\pi)$. In a third group NP, the filter component $a_i$ is negative and the hue component value $v_i$ is within the range subset $(0, \pi)$. In a fourth group NN, the filter component $a_i$ is negative and the hue component value $v_i$ is within the range subset $(\pi, 2\pi)$. Note that the hue value in each group falls into either $(0, \pi)$ or $(\pi, 2\pi)$. Also, the filter coefficients in each group are either all positive or all negative. The specific filter coefficients are defined for a specific implementation. For example, to reduce random noise, a low pass filter is implemented. There are many known low pass filte models. A filter is selected which is suitable for the image being processed. The method applied here is applied to any filter model selected to process the hue image.

At step 82, the weighted mean is computed for each of the four groups, PP, PN, NP, NN resulting in four computed mean values $F_{PP}$, $F_{PN}$, $F_{NP}$, $F_{NN}$. Each weighted mean is based on the following function. For angular signals or signal components $v_1, v_2, \ldots v_k$ in the range $(0, \pi)$ or $(\pi, 2\pi)$ and corresponding filter coefficients $a_1, a_2, \ldots a_k \ge 0$, the weighted mean WM is defined as:

$$WM = \frac{1}{a_1 + a_2 + \ldots + a_k} \sum_{i=1}^{k} a_i v_i$$

The range of angular signals is restricted to be either $(0, \pi)$ or $(\pi, 2\pi)$ so that the rounding effects are avoided. Also, the filter coefficients are restricted to being nonnegative to avoid substraction among multiple angular signals. Accordingly, $$F_{PP} = \sum_{j \in PP} \frac{|a_j|}{A_{PP}} v_j; \quad A_{PP} = \sum_{j \in PP} |a_j|$$

$$F_{PN} = \sum_{j \in PN} \frac{|a_j|}{A_{PN}} v_j; \quad A_{PN} = \sum_{j \in PN} |a_j|$$

$$F_{NP} = \sum_{j \in NP} \frac{|a_j|}{A_{NP}} v_j; \quad A_{NP} = \sum_{j \in NP} |a_j|$$

$$F_{NN} = \sum_{j \in NN} \frac{|a_j|}{A_{NN}} v_j; \quad A_{NN} = \sum_{j \in NN} |a_j|$$

At step 84, the weighted mean, $F_P$, for the positive filter coefficients and the weighted mean, $F_N$, for the negative filter coefficients are derived, as follows:

$$F'_P = \begin{cases} \left(\frac{A_{PP}}{A_P} F_{PP} + \frac{A_{PN}}{A_P} F_{PN}\right), & \text{if } F_{PN} - F_{PP} \le \pi \\ \left(\frac{A_{PP}}{A_P} F_{PP} + \frac{A_{PN}}{A_P} (F_{PN} - 2\pi)\right), & \text{if } F_{PN} - F_{PP} > \pi \end{cases}$$

$F_P = F'_P$ MOD $2\pi$, where $A_P = A_{PP} + A_{PN}$ and MOD denotes a modulo operation.

$$F'_N = \begin{cases} \left(\frac{A_{NP}}{A_N} F_{NP} + \frac{A_{NN}}{A_N} F_{NN}\right), & \text{if } F_{NN} - F_{NP} \le \pi \\ \left(\frac{A_{NP}}{A_N} F_{NP} + \frac{A_{NN}}{A_N} (F_{NN} - 2\pi)\right), & \text{if } F_{NN} - F_{NP} > \pi \end{cases}$$

$F_N = F'_N$ MOD $2\pi$, where $A_N = A_{NP} + A_{NN}$ and MOD denotes a modulo operation. The weighted means $F_{PP}$ and $F_{PN}$ are integrated into $F_P$ where the filter coefficients of $F_{PP}$ and $F_{PN}$ are positive. Similarly, $F_N$ is obtained from $F_{NP}$ and $F_{NN}$ where the filter coefficients are negative.

At step 86, a weighted distance, F, is derived for the two values achieved in the prior step 84. For any two angular signals, $v_1$ and $v_2$, with nonnegative weighted coefficients of $a_1$ and $a_2$, the weighted distance is:

$$D = \begin{cases} \left(\dfrac{a_1}{a_1+a_2}v_1 - \dfrac{a_2}{a_1+a_2}v_2\right), & \text{if } -\pi \leq v_1 - v_2 \leq \pi \\ \left(\dfrac{a_1}{a_1+a_2}v_1 - \dfrac{a_2}{a_1+a_2}(v_2 - 2\pi)\right), & \text{if } v_1 - v_2 < -\pi \\ \left(\dfrac{a_1}{a_1+a_2}(v_1 - 2\pi) - \dfrac{a_2}{a_1+a_2}v_2\right), & \text{if } v_1 - v_2 > \pi \end{cases}$$

Accordingly, the weighted distance, F, for the values achieved in step 84 is derived as:

$$F = \begin{cases} \left(\dfrac{A_P}{A}F_P - \dfrac{A_N}{A}F_N\right), & \text{if } -\pi \leq F_P - F_N \leq \pi \\ \left(\dfrac{A_P}{A}F_P - \dfrac{A_N}{A}(F_N - 2\pi)\right), & \text{if } F_P - F_N < -\pi \\ \left(\dfrac{A_P}{A}(F_P - 2\pi) - \dfrac{A_N}{A}F_N\right), & \text{if } F_P - F_N > \pi \end{cases}$$

where $A = A_P + A_N$.

The value F is the filtered hue value for a given image data pixel. A filtered hue value is obtained in the same manner for each image pixel of a desired image object or of a given image frame.

To avoid blurring the image details, in one embodiment an image edge-preserving procedure (equation VII) is applied during adaptive filtering of the saturation and hue signals as follows:

$$\text{filter coefficient at } (u,v) = \begin{cases} 0, & \text{if } |I(u,v) - I(x,y)| > 2\sigma \\ 1, & \text{if } |I(u,v) - I(x,y)| \leq 2\sigma \end{cases}$$

where (x,y) is the center pixel of the kernel, (i.e., the pixel to be filtered), and (u,v) are other pixels in the filter kernel. In the filter coefficient equation, σ is the standard deviation of noise in the RGB color space. If the threshold value is too large, the image edges end up being smoothed by the adaptive spatial filtering. It has been found that the threshold value of 2σ was effective to handle about 90% of noise in the intensity component because the variance of $n_i$ is $\sigma^2/3$. In various applications, the noise variance, $\sigma^2$, is measured or estimated in an RGB image.

Image Processing Operations

Figure 10:
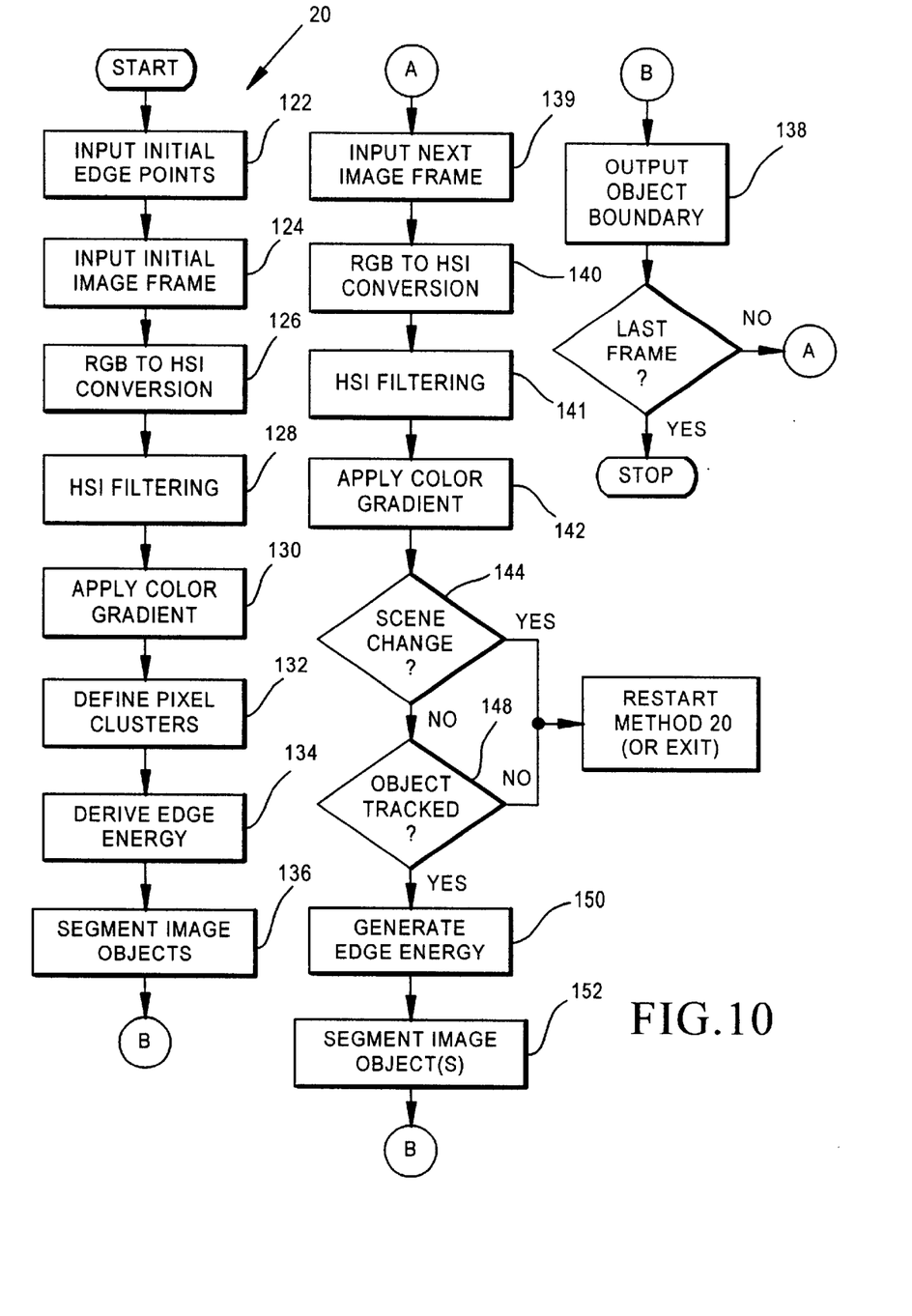
FIG. 10 is a flow chart of an image processing system according to an embodiment of this invention.

FIG. 10 is a flow chart of an exemplary image processing system which performs a method 120 for (i) applying an HSI filtering process to image data, and (ii) tracking and segmenting an image object defined by the image data, according to an embodiment of this invention. Although tracking and segmentation are described below as being performed on the filtered data, the filtering process may be applied, instead, for an alternative image processing system in which alternative image processing techniques are implemented.

Input to the method at steps 122 and 124 are initial edge points and an initial image frame. In one application the initial edge points are selected manually by an operator using a conventional video editing application interface. In another application the edge points are derived automatically and fed into a method embodiment of this invention.

At steps 126 the image data is converted from RGB to HSI color space. At step 128 the filtering processes as described above are performed on the hue, saturation and intensity components of the converted image data. At step 130 a color gradient operation is performed on the filtered data. A derivative of Gaussian (DOG) operator is applied to each HSI pixel component in the filtered image. The equation below characterizes the application of the color gradient to the filtered image resulting from the filtering step 128:

$$c(x,y) = \sqrt{\dfrac{\nabla H(x,y)^2 + \nabla S(x,y)^2 + \nabla I(x,y)^2}{3}}$$

where $\nabla H(x,y)^2 = (H(x,y)*G_h(x,y))^2 + (H(x,y)*G_v(x,y))^2$;
$\nabla S(x,y)^2 = (S(x,y)*G_h(x,y))^2 + (S(x,y)*G_v(x,y))^2$; and
$\nabla I(x,y)^2 = (I(x,y)*G_h(x,y))^2 + (I(x,y)*G_v(x,y))^2$.

$G_h(x,y)$ and $G_v(x,y)$ are the gradient operators in the horizontal and the vertical directions, respectively. The symbol * denotes a convolution operation.

The resulting HSI data then is analyzed at step 132 to define clusters of image pixels used in subsequent image frames to determine whether a scene change has occurred. At step 134, the edge energy of the input edge boundary is derived. Then at step 136 image segmentation is performed to accurately model an object boundary. The active contour model is described below in a separate section. At step 138 the modelled image object boundary is output. In some embodiments the output is written to a buffer, a file, and/or to a display. In various embodiments the RGB to HSI conversion step 126, the filtering step 128 and the color gradient step 130 may occur at any step prior to the image segmentation steps (i.e., steps 134 and 136).

Iterative processing then is performed for subsequent image frames. In some embodiments each image frame is processed. In other embodiments, image frames are periodically or aperiodically sampled. At step 139 the next image frame to be processed is input to the method implementation 120. At steps 140, 141, and 142 the image data is converted into HSI format (step 140), filtered (step 141) and subjected to a color gradient operation (step 142). The resulting HSI data then is analyzed at step 144 to determine whether a scene change has occurred for the current frame. If a scene change is detected at step 144, then the method 120 is complete, or is re-initialized to track another image object. If a scene change has not occurred, then the image object is identified from the image frame at step 148 using an object tracking process.

If at step 148 the image object is not found, then the tracking method 120 terminates or re-initializes for tracking another object. If the object is identified, then the edge energy for the object boundary is derived at step 150. Then at step 152 an object segmentation process is applied to segment the image boundary and accurately model the object boundary. At the next step, step 138 the modelled image boundary is output. As described above for the initial image frame, in some embodiments the output is written to a buffer, a file, and/or to a video screen. The process then repeats steps 138–152 for another image frame. As a result, an image object is segmented and tracked over many image frames. Thereafter, in some embodiments an encoding process is applied to encode the data into a desired format (e.g., MPEG-4 video).

Pixel Clustering and Scene Change Detection

In one embodiment the pixel clustering and scene change detection executed at steps 132 and 144 are implemented using a method of modified applied resonance theory as described in the commonly-assigned U.S. patent application Ser. No. 09/233,894, filed Jan. 20, 1999 (now U.S. Pat. No. 6,272,250 issued Aug. 7, 2001) for "Color Clustering for Scene Change Detection and Object Tracking in Video Sequences." The content of such application is incorporated herein by reference and made a part hereof.

Pattern learning and recognition is performed on a sequence of input image frames. Each image frame is a set of data points. Each pixel is a data point. A data point is referred to herein as an input vector. An input vector $P_{ij}$ corresponds to a pixel P ($x_i,y_j$) which for an HSI coding scheme has a value (H,S,I). A sequence of input vectors corresponds to a given set of data points (i.e., a current image frame). The input vectors P are grouped into clusters.

Each cluster is a learned or a recognized pattern. For a first set of input data (i.e., an initial image frame) there is no prior information for allocating the data points into clusters. Thus, the patterns are learned. For subsequent sets of data points (e.g., subsequent images in a sequence of image frames), the patterns previously learned may be used. Specifically, data points for a current set of data points (image frame) are tested to try and recognize the prior patterns in the new set of data points. The process for analyzing the subsequent sets of data points is a recognition process. During the recognition process, the previous learned patterns also are updated and modified based upon the new data.

In the course of processing a sequence of image frames of a common scene, it is expected that much of the image content is similar from image frame to image frame. As a result, the defined clusters will be similar from image frame to image frame. The hold over of the count of input vectors in a cluster used in weighting the centroid of the cluster is based upon such assumption. If while processing a given image frame however, it is determined that the prototype vectors for each one of several clusters have changed beyond a threshold amount, then it is considered that the scene being imaged has changed. Specifically, upon processing any given image frame, if more than a prescribed number of prototype vectors has changed by more than a predetermined amount, then a scene change is considered to have occurred.

A scene change is determined by tracking a cluster change ratio from image frame to image frame. Specifically, after the iterative processing of input vectors for a current image frame is complete, the cluster rate of change for that image frame is derived. Cluster rate of change is derived in a preferred embodiment using the following equation:

$$R^f = \frac{\sum_{k=1}^{n_c^f} |N_k^f - N_k^{f-1}|}{N_{total}}$$

where, $R^f$=cluster change ratio for image frame f;

$N_k^f$=number of input vectors in cluster k of frame f (actual number, not the count used in prototype vector centroid which counts input vector for each iteration);

$N_{total}$=total number of input vectors in image frame f; and $n_c^f$=number of clusters in frame f.

Note that if the k-th cluster in frame f is a new cluster, then $N_k^{f-1}$ is simply zero. A scene change is identified at step 144 (see FIG. 10) when the cluster change ratio for an image frame f exceeds a prescribed value, (e.g., 5%–10%). The prescribed value is determined empirically or be design and may exceed the example values of 5%–10%.

If a scene change is detected for a current image frame f, then the method 120 terminates, or is restarted (at step 122) with the current image frame f set to be an initial frame.

Object Tracking Operation

To track an object, the first step is to define a template to use which corresponds to the object. In one embodiment an operator loads in an input video sequence and selects points or line segments approximating a boundary of the object. A local segmentation algorithm then is applied to more accurately define the boundary. The operator may adjust points on the boundary to refine the boundary, and re-execute the segmentation algorithm using the refined boundary points to achieve a desired and accurate object. Such object serves as an initial template for locating the object in another frame.

The located object in a given frame serves as the initial template when searching for the object in the next frame to be processed. Such next frame may be the succeeding image frame in the video sequence, or the next frame to be sampled in the video sequence, or any other frame, either in sequence or out of sequence, which is the next frame to be processed. According to such approach the initial template is always changing for each frame to be processed.

In one embodiment a correlative auto-predictive search (CAPS) process is implemented as described in the commonly-assigned U.S. patent application Ser. No. 09/216, 692, filed Dec. 18, 1998 (now U.S. Pat. No. 6,301,387 issued Oct. 9, 2001) for "Template Matching Using Correlative Auto-Predictive Search." The content of such application is incorporated herein by reference and made a part hereof.

The CAPS process is executed for image frames following an initial image frame. The object to be tracked has been defined during processing of the initial image frame. The object location is updated (by the CAPS process) during processing of subsequent image frames. The initial object or the updated object from the prior frame serves as a template for locating the object in the current image frame. The object being tracked serves as a template while the current image frame serves as a search area. The template is overlaid onto a window within the search area. A motion vector is maintained which identifies the change in location of the object from one frame to the next. In some embodiments the motion vector derived from the previous frame is used to select a starting window.

The template data points are compared to the window's data points to determine if the data points correlate to a desired degree. If they do, then a match for the template has been found. In a search area formed by 'm' rows of 'n' data points, a template formed by 'k' rows of 'p' data points may be placed over (m−k+1)*(n−p+1) potential windows.

To reduce the number of windows that the template is compared with, an effective step size is derived from the template. According to a 2-dimensional implementation embodiment, a step size along a first axis is derived and a step size along a second axis is derived. Rather then compare the template to every possible window of the search area, the template is moved along either or both of the first axis and second axis by the corresponding first axis step size or second axis step size.

Once the desired step sizes are derived, then the template is compared to the various windows of the search area at the step size increments during a fast search process. In one embodiment the comparison is a correlation function of the template and the window and results in a correlation coefficient. Any window in which the correlation coefficient with the template is found to exceed a specific value is a local match for the template. In a preferred embodiment the specific value is the cut value times a threshold value.

Next, a full search then is performed in the vicinity of any location which is a local match. A full search of such vicinity encompasses performing a correlation between the template and every potential search area window between the local match location window and the windows at the prior and next step in each of the horizontal and vertical axes. For example, if the horizontal step size is 3 pixels and the vertical step size is 4 pixels, then correlations are performed for windows ±1 pixel and ±2 pixels along the horizontal axis and ±1 pixel, ±2 pixels and ±3 pixels along the vertical axis. In addition correlations are performed for windows off the axes within the area delineated by the step sizes. Thus, the full search of the vicinity of the local match for this example includes $(2*2+1)*(2*3+1)-1=34$ correlations between the template and the search area. Any locations among the local match locations and the locations tested during the full search of the vicinity which exceed the threshold value are considered template matches. In some embodiments, only the location having the highest correlation is considered a match. In other embodiments there may be multiple matches. Thus, the top matches or all matches above the threshold are selected as resultant matches.

Edge Energy

Referring to FIG. 10, edge energy is generated at steps 134 and 150. More particularly, it is edge potential energy which is derived. Various measures of potential energy may be implemented. In one embodiment a multiple level wavelet detection algorithm is used to extract high frequency components of an image. The high frequency details are analyzed to identify image object edges. In a preferred embodiment Haar wavelet detection is used.

The input to be processed to derive edge potential energy is an image. In one embodiment the image is the entire image frame. In other embodiments, the image is an image object. The derived edge potential energy is an array of potential energy for each data point (pixel) of the image.

In a preferred embodiment the horizontal detail and vertical detail of a given level (i) of decomposition are combined to generate the edge potential energy (EPE) for that level as follows:

$EPE(i)$=sqrt [horizontal detail$^2(i)$+vertical detail$^2(i)$]

where i=i-th level of decomposition.
For an embodiment in which 5 levels of decomposition are executed, the total edge potential energy (EPE) for a given color component are summed together:

$EPE_c=EPE_c(2)+2*EPE_c(4)+4*EPE_c(6)+8*EPE_c(8)+16*EPE_c(10)$ where c is the color component being processed.
The overall edge potential energy for the entire frame, inclusive of all color components is the weighted sum of the energy from the different color components. For a weighting factor of (1, 1, 1) the total potential energy is given by:

Total Edge Potential Energy=$EPE_y+EPE_{cr}+EPE_{Cb}$ where Y, Cr and Cb are the color components. In other embodiments R,G and B color components or those of another color component model may be used. The weighting factor may vary depending on the color components model being used.
The total edge potential energy is an array having an energy value for each pixel of the image processed.

Object Segmentation

Once an image object has been identified, the image boundary (i.e., edge) is segmented to more accurately model the object edges. In one embodiment the object segmentation subsystem 18 is based upon an active contour modelling method. However, other segmentation methods are known and may be substituted. Detailed descriptions of an object segmentation process are described in commonly-assigned U.S. patent application Ser. No. 09/323,501 filed Jun. 1, 1999 naming Sun et al. titled, "Video Object Segmentation Using Active Contour Model with Global Relaxation;" and in commonly-assigned U.S. patent application Ser. No. 09/500,403, filed Feb. 9, 2000 naming Schoepflin et al. titled, "Video Object Tracking Using a Hierarchy of Deformable Templates," the contents of such application being incorporated herein by reference and made a part hereof.

For embodiments implementing an active contour modelling method, the derived total edge potential energy and a current image object boundary are input to the active contour modelling process. The total edge potential energy is derived at step 150 (see FIG. 10). For an initial frame the current image object boundary is the boundary input to the system at step 122. The set of data points for the current image object boundary are used by the active contour model at step 136.

For subsequent image frames, the current image object boundary is similarly derived in which the set of data points for the current image object boundary are used by the active contour modelling process at step 152.

Encoding Operation

When other processing is complete, an encoder is activated to encode and compress the finalized image frame or video sequence into a desired format. In one embodiment a MPEG-4 encoder is implemented.

In one embodiment the operator is able to analyze the output quality by viewing peak signal to noise ratios per color component or per number of bit encoding. In addition, the operator can alter some encoding parameters and view the results for many different encodings to find the encoding settings that provide the desired trade-off to achieve a satisfactory image quality at some number of bits encoded per pixel. By segmenting the object image the operator is able to provide more bits for encoding the segmented image object(s) then for the other portions of the image frame(s). Thus, increased precision is achieved for the image object(s) of interest.

Meritorious and Advantageous Effects

An advantage of the invention is that image segmentation techniques are performed in HSI color space where color sensing properties more closely resemble human vision. According to another advantage of this invention, object boundaries are preserved while noise level is significantly reduced and the noise variance is made more uniform.

Although preferred embodiments of the invention have been illustrated and described, various alternatives, modifications and equivalents may be used. Although the filtering processes are shown in conjunction with an image tracking and segmentation application, in other embodiments the filtering process need not be so combined. The filtering process may stand alone, or be combined with one or more of the same or other processes and subsystems to form an alternative system for image processing.

Further, although the filtering methods are described for a hue signal, the methods are applicable to any signal having an angular periodic format, (referred to as an angular signal).

Therefore, the foregoing description should not be taken as limiting the scope of the inventions which are defined by the appended claims.

What is claimed is:

1. A method for segmenting an image frame of pixel data, the image frame including a plurality of pixels, the pixel data corresponding to the pixels, the method comprising the steps of:

for each pixel of the image frame, converting the corresponding pixel data into hue, saturation, intensity color space to achieve HSI pixel data having a hue component, a saturation component and an intensity component;

filtering the HSI pixel data to achieve filtered HSI pixel data, wherein for each one HSI pixel data, the hue component is filtered using a plurality of hue components corresponding to a window of pixels in the vicinity of said one HSI pixel data;

identifying presence of an image object in the image frame; and segmenting the image frame to define a set of filtered HSI pixel data corresponding to the image object, wherein the step of filtering comprises, for each one HSI pixel data:

allocating each one of said plurality of hue components corresponding to said window among a plurality of groups, each one group of the plurality of groups corresponding to both a range subset of hue component values and a sign of corresponding filter coefficients, wherein a first group of the plurality of groups corresponds to hue components within a first range subset being filtered by filters having filter coefficients of a first sign, wherein a second group of the plurality of groups corresponds to hue components within a second range subset being filtered by filters having filter coefficients of the first sign, wherein a third group of the plurality of groups corresponds to hue components within the first range subset being filtered by filters having filter coefficients of a second sign, wherein a fourth group of the plurality of groups corresponds to hue components within the second range subset being filtered by filters having filter coefficients of the second sign;

deriving for each one group of the plurality of groups a weighted average of the hue components allocated to said one group wherein the weights are based upon the associated filter coefficients;

deriving a first weighted average for the first group and the second group combined, based on the derived weighted averages for the first group and the second group, and the filter coefficients of the first sign associated with the first group and the second group;

deriving a second weighted average for the third group and the fourth group combined, based on the derived weighted averages for the third group and the fourth group, and the filter coefficients of the second sign associated with the third group and the fourth group; and deriving a weighted distance of the first weighted average and the second weighted average, wherein the weighted distance is a filtered hue component value for said one HSI pixel data.

2. The method of claim 1, wherein the step of filtering further comprises:

respectively selecting and applying for each one pixel of the image frame, a first filter kernel from a plurality of filter kernels which filters the saturation component of HSI pixel data corresponding to said one pixel.

3. The method of claim 2, in which the step of selecting the first filter kernel to filter the saturation component comprises testing the intensity component of the corresponding HSI pixel data against a set of threshold values to determine which filter kernel among the plurality of filter kernels is applied to filter the saturation component.

4. The method of claim 1, further comprising the step of:

encoding the image frame, wherein the pixel data corresponding to the image object is encoded at a higher bit rate than other pixel data corresponding to another portion of the image frame.

5. The method of claim 1, further comprising the step of performing a color gradient operation on the filtered HSI pixel data; and wherein the step of segmenting comprises segmenting the image frame after the color gradient operation is performed, wherein the set of filtered HSI pixel data corresponding to the image object is filtered HSI pixel data which has received the color gradient operation.

6. A system for segmenting an image frame of pixel data, the image frame including a plurality of pixels, the pixel data corresponding to the pixels, the system comprising:

a processor which converts, for each pixel of the image frame, the corresponding pixel data into hue, saturation, intensity color space to achieve HSI pixel data having a hue component, a saturation component and an intensity component;

a filter receiving the HSI pixel data which generates filtered HSI pixel data, wherein for each one HSI pixel data, the hue component is filtered using a plurality of hue components corresponding to a window of pixels in the vicinity of said one HSI pixel data;

a processor which identifies presence of an image object in the image frame;

a processor which segments the image frame to define a set of filtered HSI pixel data corresponding to the image object.

wherein the filter executes, for each one HSI pixel data, a set of functions comprising:

allocating each one of said plurality of hue components corresponding to said window among a plurality of groups, each one group of the plurality of groups corresponding to both a range subset of hue component values and a sign of corresponding filter coefficients, wherein a first group of the plurality of groups corresponds to hue components within a first range subset being filtered by filters having filter coefficients of a first sign, wherein a second group of the plurality of groups corresponds to hue components within a second range subset being filtered by filters having filter coefficients of the first sign, wherein a third group of the plurality of groups corresponds to hue components within the first range subset being filtered by filters having filter coefficients of a second sign, wherein a fourth group of the plurality of groups corresponds to hue components within the second range subset being filtered by filters having filter coefficients of the second sign;

deriving for each one group of the plurality of groups a weighted average of the hue components allocated to said one group wherein the weights are based upon the associated filter coefficients;

deriving a first weighted average for the first group and the second group combined, based on the derived weighted averages for the first group and the second group, and the filter coefficients of the first sign associated with the first group and the second group;

deriving a second weighted average for the third group and the fourth group combined, based on the derived weighted averages for the third group and the fourth group, and the filter coefficients of the second sign associated with the third group and the fourth group; and deriving a weighted distance of the first weighted average and the second weighted average, wherein the weighted distance is a filtered hue component value for said one HSI pixel data.

7. The system of claim 6, further comprising:
an encoder which encoding the image frame, wherein the pixel data corresponding to the image object is encoded at a higher bit rate than other pixel data corresponding to another portion of the image frame.

8. The system of claim 6, further comprising a processor which performs a color gradient operation on the filtered HSI pixel data; and wherein the segmented image frame is segmented after the color gradient operation is performed and the set of filtered HSI pixel data corresponding to the image object is filtered HSI pixel data which has received the color gradient operation.

9. A method for filtering an image portion, the image portion comprising a plurality of pixel data, the method comprising the steps of:

converting the plurality of pixel data into hue, saturation, intensity color space to achieve HSI pixel data having a hue component, a saturation component and an intensity component;

for each one of the HSI pixel data, filtering the hue component using a plurality of hue components corresponding to a window of pixels in the vicinity of said one of the HSI pixel data;

wherein the step of filtering the hue component comprises:

allocating each one of said plurality of hue components corresponding to said window among a plurality of groups, each one group of the plurality of groups corresponding to both a range subset of hue component values and a sign of corresponding filter coefficients, wherein a first group of the plurality of groups corresponds to hue components within a first range subset being filtered by filters having filter coefficients of a first sign, wherein a second group of the plurality of groups corresponds to hue components within a second range subset being filtered by filters having filter coefficients of the first sign, wherein a third group of the plurality of groups corresponds to hue components within the first range subset being filtered by filters having filter coefficients of a second sign, wherein a fourth group of the plurality of groups corresponds to hue components within the second range subset being filtered by filters having filter coefficients of the second sign;

deriving for each one group of the plurality of groups a weighted average of the hue components allocated to said one group wherein the weights are based upon the associated filter coefficients;

deriving a first weighted for the first group and the second group combined, based on the derived weighted averages for the first group and the second group, and the filter coefficients of the first sign associated with the first group and the second group;

deriving a second weighted average for the third group and the fourth group combined, based on the derived weighted averages for the third group and the fourth group, and the filter coefficients of the second sign associated with the third group and the fourth group; and deriving a weighted distance of the first weighted average and the second weighted average, wherein the weighted distance is a filtered hue component value for said one HSI pixel data.

10. The method of claim 9, further comprising the step of:
respectively selecting and applying for each one pixel of the image frame, a first filter kernel from a plurality of filter kernels which filters the saturation component of HSI pixel data corresponding to said one pixel.

11. The method of claim 10, in which the step of selecting the first filter kernel to filter the saturation component comprises testing the intensity component of the corresponding HSI pixel data against a set of threshold values to determine which filter kernel among the plurality of filter kernels is applied to filter the saturation component.

12. The method of claim 9, further comprising the step of performing a color gradient operation on the filtered HSI pixel data.

13. A system for filtering an image portion, the image portion comprising a plurality of pixel data, the system comprising:

a processor which converts the plurality of pixel data into hue, saturation, intensity color space to achieve HSI pixel data having a hue component, a saturation component and an intensity component; and a filter receiving the HSI pixel data which generates filtered HSI pixel data, wherein for each one HSI pixel data, the hue component is filtered using a plurality of hue components corresponding to a window of pixels in the vicinity of said one HSI pixel data, wherein the filter executes, for each one HSI pixel data, a set of functions comprising:

allocating each one of said plurality of hue components corresponding to said window among a plurality of groups, each one group of the plurality of groups corresponding to both a range subset of hue component values and a sign of corresponding filter coefficients, wherein a first group of the plurality of groups corresponds to hue components within a first range subset being filtered by filters having filter coefficients of a first sign, wherein a second group of the plurality of groups corresponds to hue components within a second range subset being filtered by filters having filter coefficients of the first sign, wherein a third group of the plurality of groups corresponds to hue components within the first range subset being filtered by filters having filter coefficients of a second sign, wherein a fourth group of the plurality of groups corresponds to hue components within the second range subset being filtered by filters having filter coefficients of the second sign;

deriving for each one group of the plurality of groups a weighted average of the hue components allocated to said one group wherein the weights are based upon the associated filter coefficients;

deriving a first weighted for the first group and the second group combined, based on the derived weighted averages for the first group and the second group, and the filter coefficients of the first sign associated with the first group and the second group;

deriving a second weighted average for the third group and the fourth group combined, based on the derived weighted averages for the third group and the fourth group, and the filter coefficients of the second sign associated with the third group and the fourth group; and deriving a weighted distance of the first weighted average and the second weighted average, wherein the weighted distance is a filtered hue component value for said one HSI pixel data.

14. The system of claim 13, further comprising:

an averaging filter having a kernel size adapted for each pixel, the averaging filter increasing uniformity of noise distribution of the HSI pixel data, the averaging filter comprising:

means for respectively selecting and applying for each one pixel of the HSI pixel data, a first filter kernel from a plurality of filter kernels, said first kernel filtering the saturation component of said each one pixel of the HSI pixel data to achieve a filtered saturation component of the HSI pixel data.

15. The system of claim 14, in which the means for selecting the first filter kernel to filter the saturation component comprises means for testing the intensity component of the corresponding HSI pixel data against a set of threshold values to determine which filter kernel among the plurality of filter kernels is applied to filter the saturation component.

16. The system of claim 13, in which the image portion is an image frame among a sequence of image frames, the system further comprising:

means for identifying presence of an image object in the image frame; and means for segmenting the image frame to define a set of filtered HSI pixel data corresponding to the image object.

17. The system of claim 16, further comprising: means for performing a color gradient operation on the filtered HSI pixel data; and wherein the segmenting means comprises means for segmenting the image frame after the color gradient operation is performed, wherein the set of filtered HSI pixel data corresponding to the image object is filtered HSI pixel data which has received the color gradient operation.

* * * * *